Jan. 11, 1938.   W. J. GAZEY   2,105,241
HEADER AND METHOD OF MAKING THE SAME
Filed July 8, 1936   3 Sheets-Sheet 1
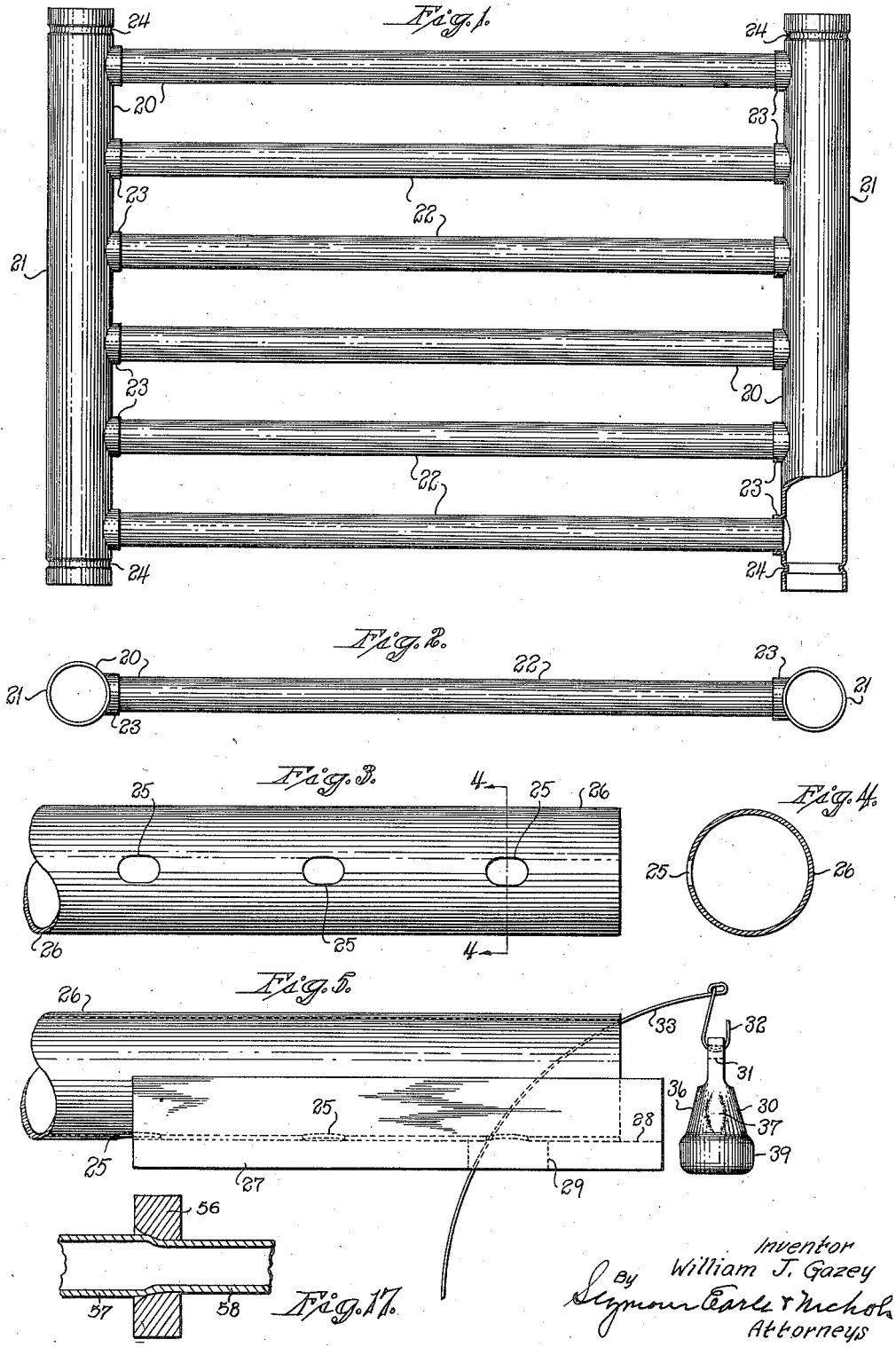
Inventor
William J. Gazey
By Seymour Earle & Nichols
Attorneys

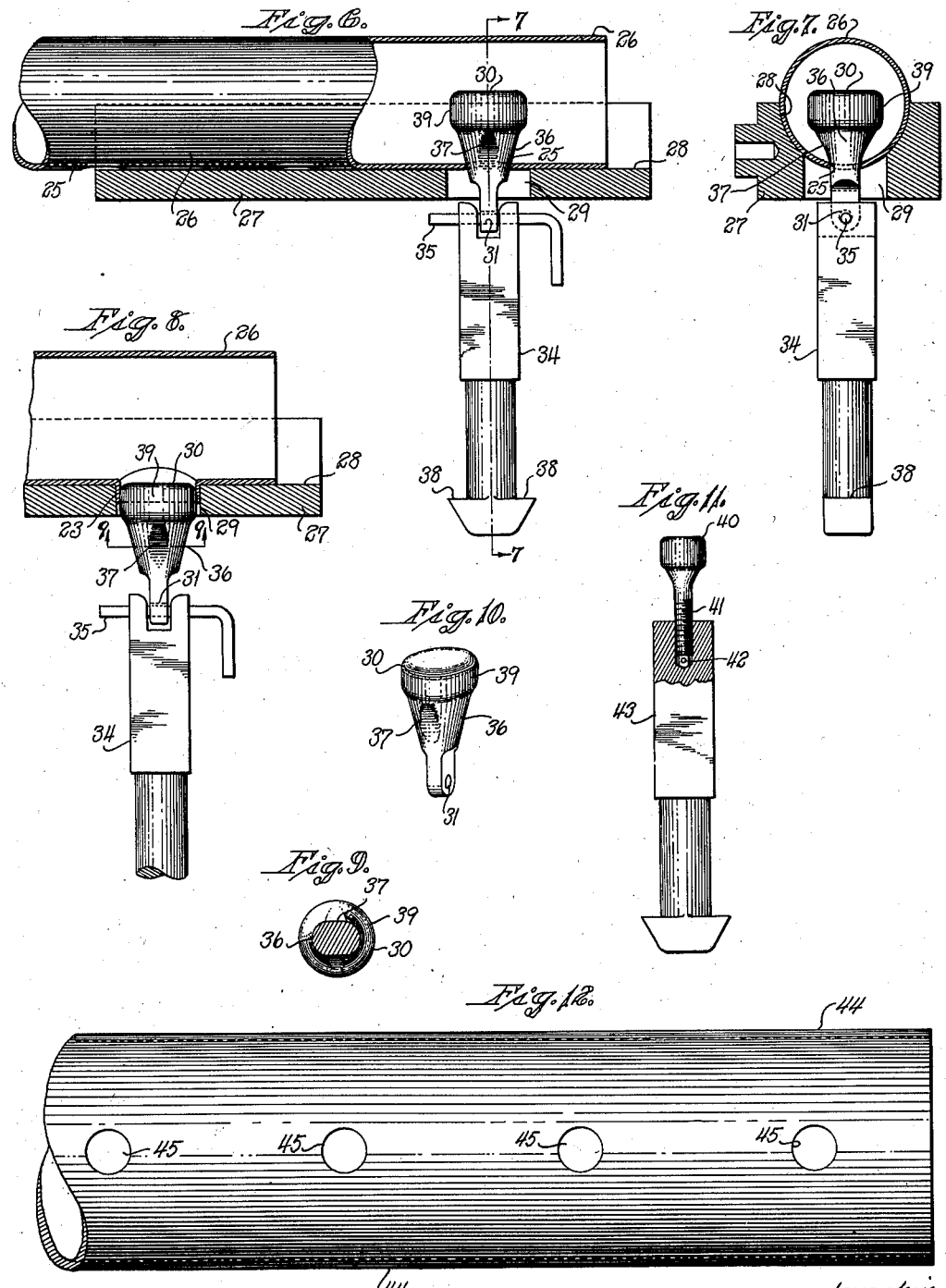

Jan. 11, 1938.  W. J. GAZEY  2,105,241
HEADER AND METHOD OF MAKING THE SAME
Filed July 8, 1936  3 Sheets-Sheet 3
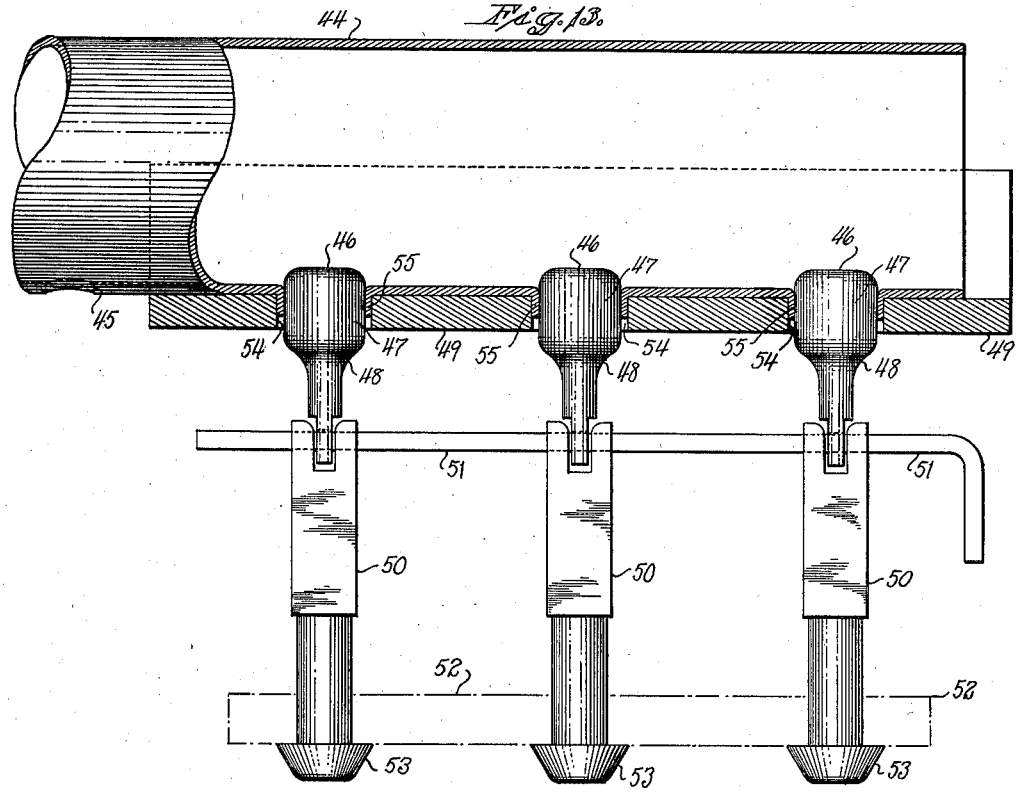
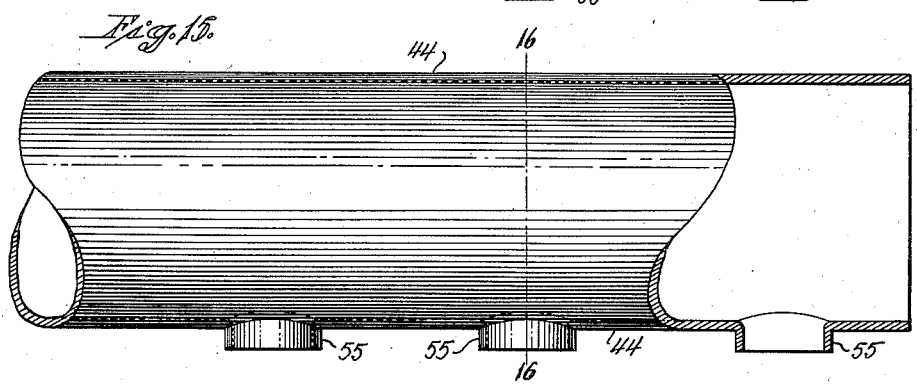
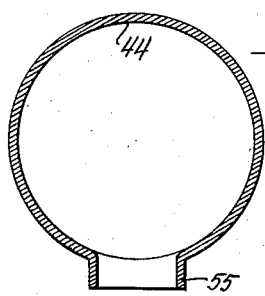
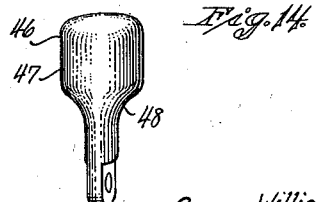
Inventor
William J. Gazey
By Seymour Earle & Nichols
Attorneys Patented Jan. 11, 1938

2,105,241

UNITED STATES PATENT OFFICE 2,105,241

HEADER AND METHOD OF MAKING THE SAME

William J. Gazey, Waterbury, Conn., assignor to The Chase Companies, Incorporated, Waterbury, Conn., a corporation of Connecticut Application July 8, 1936, Serial No. 89,534

6 Claims. (Cl. 29—157.4)

This invention relates to improvements in headers and methods of making the same.

One object of this invention is to provide an improved header formed of a wrought-tubular member.

Another object of this invention is to provide an improved method of making wrought-tubular headers.

With the above and other objects in view, this invention includes all improvements over the prior art which are disclosed in this application.

In the accompanying drawings in which certain ways of carrying out the invention are shown for illustrative purposes:

Fig. 1 is a front elevation, partly in section, illustrating a heat-exchange unit having headers constructed in accordance with this invention;

Fig. 2 is a top plan view of Fig. 1;

Fig. 3 is a side view of a tubular member from which a header is to be made;

Fig. 4 is a sectional view on the plane indicated by line 4—4 of Fig. 3;

Fig. 5 is a view illustrating a die, a tubular member and a flanging-plug, at an intermediate stage of manufacture of a header in accordance with this invention;

Fig. 6 is a view somewhat similar to Fig. 5 but with the die in longitudinal section and with the flanging-plug in position and connected to a key for flanging out one of the flanges of the header;

Fig. 7 is a sectional view on the plane indicated by line 7—7 of Fig. 6;

Fig. 8 is a view similar to Fig. 6 but with the flanging-plug nearly pulled through one of the holes to form one of the flanges of the header;

Fig. 9 is a sectional view of the flanging-plug on the plane indicated by line 9—9 of Fig. 8;

Fig. 10 is a perspective view of the flanging-plug shown in Figs. 5 to 9 inclusive;

Fig. 11 is a front elevation of a modified form of flanging-plug and key;

Fig. 12 is a side view of a larger tubular member than is illustrated in Figs. 3 to 8, and provided with round instead of elongated holes;

Fig. 13 is a view somewhat similar to Fig. 8 but illustrating a method of flanging out a plurality of flanges at one operation on the tubular member shown in Fig. 12;

Fig. 14 is a perspective view of a modified form of flanging-plug used in the flanging operation shown in Fig. 13;

Fig. 15 is a side view, partly in section, of a portion of a header formed by the operation illustrated in Fig. 13;

Fig. 16 is a sectional view on the plane indicated by line 16—16 of Fig. 15; and Fig. 17 is a fragmentary longitudinal sectional view illustrating the sinking operation.

In the description and claims, the various parts are identified by specific names for convenience, but they are intended to be as generic in their application as the prior art will permit.

Referring to Figs. 1 to 10 of the drawings, 20 represents a heat-exchange unit which may, for example, be for refrigeration or air conditioning apparatus, and which unit 20 is formed from two headers 21 interconnected by means of a plurality of tubes 22. Each header has a plurality of tubular flanges or sleeves or skirts 23 in each of which fits a tube 22, which latter may be suitably secured therein, as by soldering or sweating.

The headers 21 may have their ends closed in any desired way or connected to any desired apparatus depending upon the use to which the heat-exchange unit is to be put. If desired, one or both ends of each header 21 may have an annular-rolled or pressed-in rib 24 to form an abutment against which a metal disk or fitting may be inserted in the end of the header and sweated therein.

When the diameter of the tubular flanges 23 of a header are to be large compared to the diameter of the header, it is desirable to cut holes 25 of non-circular, elongated form in the tubular member 26 from which a header is to be made, such, for example, as illustrated in Fig. 3, in order that the top edge of each finished tubular-flange may be sufficiently close to plane or flat to avoid the need of any finishing operation. Holes 25 can readily be formed by a milling tool in a well known manner.

The tubular-member 26 may consist either of tubing drawn or otherwise formed, or a drawn shell having the bottom edged out. Copper or copper-base alloys form very satisfactory metals from which to form headers in accordance with this invention.

In order to flange out or ball out the tubular flanges 23, a die member 27 is secured to, or adjacent to, any suitable machine for supplying power for the flanging-out operation, such, for example, as a punch-press.

The die 25 has a part-cylindrical upper surface 28 in which the tubular member 26 is adapted to fit (Figs. 5, 6, 7, and 8). The die 27 has a cylindrical hole 29 extending through its bottom. The flanging-plug or ball 30 has its hole 31 hooked over the hook 32 which is connected to the music wire 33 which latter is extended through one of the holes 25 by any desired procedure (Fig. 5) and down through the hole 29 in the die block 27. By pulling the music wire 33 downwardly, the flanging-plug 30 is brought into the position shown in Fig. 6, whereupon the hook 32 is removed from the hole 31 of the flanging-plug 30 and a key 34 is brought into position and secured to the shank of the flanging-plug by passing a pin 35 through holes in the key and through the hole 31 in the flanging-plug.

If desired, the music wire 33 may be passed from the outside of the tubular member 26, in through a hole 25, while holes 25 occupy a rotational position somewhat above that shown in Fig. 3, and the music wire may be passed out the end of the tubular member 26 to have the flanging-plug 30 attached to the hook 32 to draw the plug 30 into proper position, after which the tube 26 is rotated to the position shown in Fig. 5.

The surface 36 of the flanging-plug is of generally conical form but with two opposite cutaway portions 37, the cross sectional form of the plug where it enters one of the holes 25 being illustrated in Fig. 9. In other words, the cross sectional shape of the plug where it engages the hole 25 prior to the flanging-out operation conforms to the shape of the hole.

The tubular member 26 may be held or locked in the die 27 by any suitable means, any known or suitable method being employed to align the holes 25 and 29, and any suitable power means, such, for example, as a special set-up on an ordinary punch-press a pivoted arm having a fork engaging the opposite ears 38 of the key 34 may be made to pull the key 34 downward with ample power to pull the flanging plug through the holes 25 and 29 to produce one of the flanges 23. After one flange 23 is formed, the tubular member 26 is removed from the die-block 27 and shifted along to bring successive holes 25 in proper centered position to be flanged out in a similar manner to that heretofore described.

It will be observed that the portion 39 of the flanging-plug is cylindrical. In practice, depending upon the diameter of the tubular member being operated upon, the cylindrical portion 39 of the flanging-plug may range from .002" to .004" or more larger than the diameter of hole 29 minus twice the thickness of the metal of the tubular member 26, thus resulting in a compressing and flowing operation of the metal forming the flanges 23 of the header, and this flowing operation is performed at its best when the portion 39 of the flanging-plug is cylindrical. By this operation, the entire metal of the flange 23 is flowed, worked, elongated and planished, leaving the internal diameter of the flange 23 substantially cylindrical and suitable for making an excellent soldered or sweat-fitting joint with a tube 22 (Fig. 1).

Where an especially small flange 23 is to be formed, it may be impractical to form a large enough hole through the shank of the flanging-plug to withstand the powerful pull necessary in the flanging-out operation, and in such instance a modified construction such as illustrated in Fig. 11 may be employed wherein a flanging-plug 40 may have a screw-threaded shank 41 provided with a hole 42 through its lower end for temporary engagement with the hook 32 for bringing into position for the flanging operation, whereupon when the hook 32 is removed, the key 43 has its threaded hole rotated upon the threaded shank 41. Flanging-out operations with a construction such as illustrated in Fig. 11 is carried out in a manner similar to that previously described.

Where the size of a tubular member 44 (Fig. 12) is large compared to the size of the flanges to be made on the header, it is not necessary to make an elongated opening such as has been heretofore described, but round openings 45 adequately serve since the top surfaces of the flanges produced are sufficiently close to plane or flat as not to require any finishing operation. A tubular member such as 44 illustrated in Fig. 12 can be flanged out in a similar manner to that heretofore described, except that a somewhat different shape of flanging-plug 46 (Fig. 14) is employed, which has a cylindrical portion 47 and a sloping or conical portion 48.

In Fig. 13 a mode of flanging out is illustrated in which a plurality of flanges are simultaneously formed at a single operation by means of plurality of flanging-plugs, thus the tubular member 44 can be placed in the die-block 49 and flanging-plugs 46 connected to keys 50 in any suitable way as by means of a pin 51, and the keys simultaneously pulled downward by any suitable power means as, for example, by a bar 52 engaging the headed-ends 53 of the keys 50 and simultaneously forcing the keys downward by actuation from a punch-press as heretofore described or by any other suitable power means to thus simultaneously draw the plugs 46 down through the holes 45 of the tubular member 44, and through the holes 54 of the die block 49 to thus simultaneously form a plurality of flanges 55 on the tubular member 44. After one group of flanges 55 are formed, the tubular member 44 may be shifted along to bring successive groups of holes into position for flanging-out operations.

The tubular member to be subjected to the flanging-out operations will ordinarily be formed by a succession of drawing operations employing a succession of dies and center plugs which reduce the diameter and the wall thickness of the tube. Between drawings, and after the last drawing, the tube is given an annealing treatment all as is usual in tube drawing. Then the annealed tube is subjected to a sinking operation employing a die such, for example, as shown at 56 in Fig. 17, but no center plug. This sinking operation reduces the diameter of the tube 57 much less than is ordinarily done by a drawing operation and also thickens the tube, as illustrated at 58, instead of thinning it as usually occurs in a drawing operation. This sinking operation leaves the exterior of the tube hard, as is desirable for practical use, and the interior distinctly softer than the exterior. The relatively soft interior is important as it permits of flanging-out longer tubular flanges or sleeves than would otherwise be possible, which longer tubular flanges are important for the accomplishment of a soldered or sweated connection of maximum efficiency.

Where heavy gage tubular members are used, it may be preferable to perform the flanging-out operation in two or more steps employing two or more flanging-plugs of successively slightly larger size.

The invention may be carried out in other specific ways than those herein set forth without departing from the spirit and essential characteristics of the invention, and the present embodiments are therefore to be considered in all respects as illustrative and not restrictive, and all changes coming within the meaning and equivalency range of the appended claims are intended to be embraced therein.

I claim:

1. A header formed from an annealed wrought tubular member which has been finish-formed by a sinking operation without the use of an internal mandrel, by flanging out a plurality of tubular flanges spaced apart longitudinally along the side of said tubular member with said tubular flanges extending transversely of the longitudinal axis of said tubular member.

2. A header formed from an annealed substantially copper cylindrical wrought tubular member which has been finish-formed by a sinking operation without the use of an internal mandrel, by flanging out a plurality of cylindrical tubular flanges spaced apart longitudinally along the side of said tubular member with said tubular flanges extending transversely of the longitudinal axis of said tubular member.

3. The method of making a header comprising finish-forming an annealed wrought tubular member by means of a sinking operation without the use of an internal mandrel, and then flanging out a plurality of tubular flanges at spaced-apart locations longitudinally along the side of the tubular member with said tubular flanges extending transversely of the longitudinal axis of said tubular member.

4. The method of making a header comprising finish-forming an annealed wrought tubular member by means of a sinking operation without the use of an internal mandrel, and then flanging out a plurality of tubular flanges at spaced-apart locations longitudinally along the side of the tubular member with said tubular flanges extending transversely of the longitudinal axis of said tubular member, by drawing a flanging plug out through each of said holes.

5. The method of making a header comprising finish-forming an annealed wrought tubular member by means of a sinking operation without the use of an internal mandrel, and then flanging out a plurality of tubular flanges at spaced-apart locations longitudinally along the side of the tubular member with said tubular flanges extending transversely of the longitudinal axis of said tubular member, by drawing a flanging plug having a cylindrical flanging portion, out through each of said holes.

6. The method of making a header comprising finish-forming an annealed wrought substantially copper tubular member by means of a sinking operation without the use of an internal mandrel, and then flanging out a plurality of tubular flanges at spaced-apart locations longitudinally along the side of the tubular member with said tubular flanges extending transversely of the longitudinal axis of said tubular member, by drawing a flanging plug having a cylindrical flanging portion, out through each of said holes and through an annular die hole of small enough diameter to cause the metal of said flanges to be compressed and flowed.

WILLIAM J. GAZEY.